United States Patent

[11] 3,604,719

| [72] | Inventor | Raymond W. Kerr |
| | | 3731 N. 58th St., Lincoln, Nebr. 68529 |
| [21] | Appl. No. | 5,547 |
| [22] | Filed | Jan. 26, 1970 |
| [45] | Patented | Sept. 14, 1971 |

[54] TOWABLE LIQUIDS STORAGE TANK ASSEMBLY
4 Claims, 5 Drawing Figs.

[52] U.S. Cl. ........................................................ 280/5,
150/0.5, 264/225
[51] Int. Cl. ........................................................ B60p 3/22
[50] Field of Search ........................................... 280/5, 5 D;
150/0.5

[56] References Cited
UNITED STATES PATENTS

| 3,095,206 | 6/1963 | Fresia ........................ | 280/5 D |
| 3,155,133 | 11/1964 | Clergerie .................... | 150/0.5 |
| 3,222,099 | 12/1965 | Swallert ..................... | 280/5 D X |
| 3,282,361 | 11/1966 | Mackie ....................... | 150/0.5 X |
| 3,295,482 | 1/1967 | Dountas et al. ............. | 111/7 |
| 3,388,203 | 6/1968 | Meininger et al. .......... | 264/225 |
| 3,510,142 | 5/1970 | Erke ........................... | 280/5 |

*Primary Examiner*—Leo Friaglia
*Attorney*—George R. Nimmer

ABSTRACT: This invention provides a towable liquids storage tank assembly which is especially adaptable for the transporting of agricultural liquid chemicals including fertilizers and pesticides. Primary portions of the towable tank assembly include an elongate thin-walled resinous storage tank, an underlying separable tublike saddle therefor, and a rollably towable trailerlike support means for the saddled tank. The tublike saddle is preferably of a resinous construction molded by the novel method herein i.e. against the lower external surface areas of the elongate resinous storage tank.

PATENTED SEP 14 1971

RAYMOND W. KERR
INVENTOR.

BY *George P. Rimmer*
ATTORNEY

TOWABLE LIQUIDS STORAGE TANK ASSEMBLY

It is the general object of the present invention to provide a towable liquids storage tank assembly which is especially adaptable for the transporting of agricultural liquid chemicals including fertilizers and pesticides, both upon a public roadway immediately after the tank has been charged with the liquid chemical at a supply depot and also along the agricultural terrain during application and field use of the liquid chemical.

It is another object of the present invention to provide a large capacity storage tank for the chemical liquids wherein the tank is of low economical cost, is of exceeding chemical and physical resistance to the chemical liquids to be stored therewithin, and which is not apt to contaminate the said chemical liquids.

It is another object to provide a large capacity, economical, and chemically resistant storage tank that is adaptable for use with prior art trailerlike rollable supports of the prevalent type having a plurality of spaced-apart parallel rails at the upper side of the trailerlike vehicle.

It is another object to provide a novel resin molding technique that is desireable for a wide range of use applications including within the purview of the towable liquids storage tank assembly of the present invention.

With the above and other objects and advantages in view, which will become more apparent as this description proceeds, the towable liquids storage tank assembly of the present invention comprises an elongate thin-walled polyolefin resinous storage tank, nonadherently closely conformably nesting within an elongated tublike saddle, the saddle resting across the several spaced-apart parallel rails on the upper side of the trailerlike rollable support means; a novel molding technique for making the resinous tublike saddle utilizes the lower external surfaces of the elongate polyolefin tank as a moldlike pattern thereof.

In the drawing, wherein like characters refer to like parts in the several views, and in which:

FIG. 4 is a schematic flow diagram to illustrate novel processing steps, which are adaptable for providing the towable liquids storage tank assembly of the present invention and for other articles as well.

Figure 1:
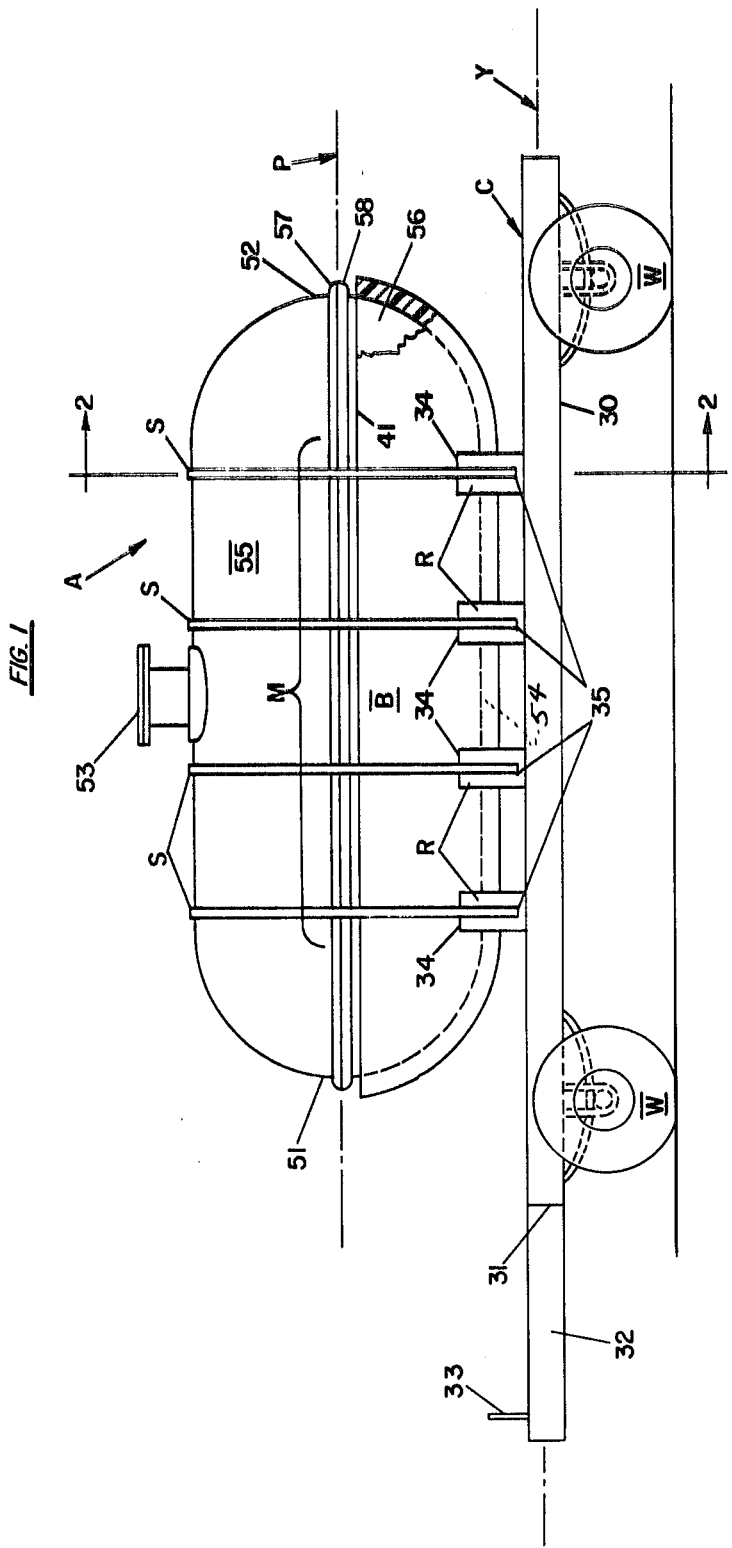
FIG. 1 is a side elevational view of the towable liquids storage tank assembly of the present invention, a portion of the tublike saddle being broken away from the tank.

As has been previously mentioned, the towable storage tank assembly of the present invention comprises: a rollably towable trailerlike support means e.g. C, having a plurality of spaced-apart coelevational substantially parallel rails R; an elongate tubelike saddle B resting upon rails R and removably attached to trailer C, said elongate saddle B having an interior side in conformity to the elongate lower surface portion 56 of hollow tank A; and the elongate hollow thin-walled polyolefin tank A removably nesting within tublike saddle B.

The trailerlike rollable towable support means e.g. C, is of the well-known generic class comprising an elongate wheeled frame disposed along a substantially horizontal longitudinal axis Y, herein said elongate frame comprising a pair of parallel longitudinal-members 30 spaced on opposite sides of and parallel to longitudinal axis Y. Members 30 have a forward terminus at 31, said support member C forwardly of terminii 31 having a generally horizontal drawbar 32 which is typically provided with an upright hitch pin 33 for removable attachment to a tractor or other drayage means. There are two or more (herein as four) upright rollable wheels W revolvably attached to the support means frame, the wheel axles X being transverse to longitudinal axis Y. As is well known in the prior art, the unobstructed upper side of towable trailer C comprises a plurality of spaced-apart substantially parallel rails R (herein four such rails R being arbitrarily employed), each rail R being rigidly attached as by welding upon both longitudinal rails 30. The upper surfaces 34 of the several rails R are of substantially coelevation, and herein curvilinearly concave, to support thereon an elongate storage tank e.g. A, or the tublike saddle B of the present invention. Herein, each transverse rail R is provided with an extended slot 35 parallel to the contour length 34 so as to accommodate along slot 35 the anchoring strap S. While the rails R herein are perpendicularly transverse to longitudinal axis Y so that the tank axis P is parallel to Y, there are prior art trailerlike rollable supports wherein the spaced-apart parallel rails R are longitudinal i.e. coparallel with axis Y, whereby tank axis P is transversely perpendicular to Y. The teachings of the present invention are adaptable to both longitudinal and transverse spaced-apart parallel rails e.g. R, to support thereon the novel saddle B herein.

Figure 2:
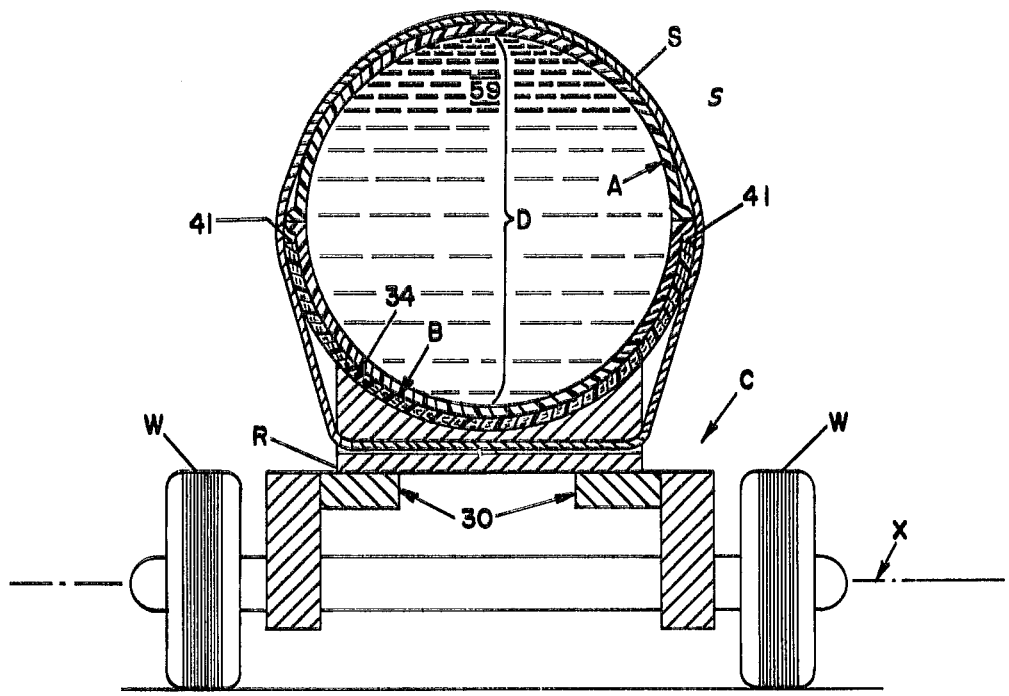
FIG. 2 is a sectional elevational view taken along line 2—2 of FIG. 1.
Figure 3:
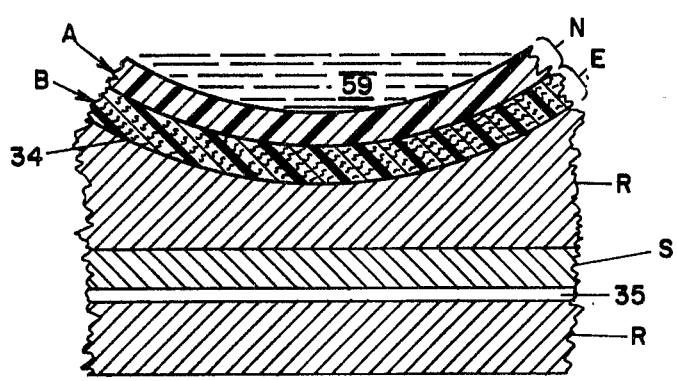
FIG. 3 is a detail view of FIG. 2, showing in particular certain important structural relationships.

Elongate hollow thin-walled liquids storage tank A is disposed along a substantially horizontal tank axis P, said tank A having a pair of end extremities 51 and 52 at tank axis P whereby tank A has a finite given length along tank axis P between tank ends 51 and 52, the two endward portions of tank A converging herein toward tank axis P at ends 51 and 52. Tank axis P has a preponderant length M, and the tank elongate wall portions annularly circularly surround axial length M whereby, as shown in FIG. 2, the tank has an internal diameter or vertical height D. Thus, the tank A along the preponderant length portion M is of substantially regular vertical cross-sectional shape including a regular wall thickness N for the annularly circular wall portions. The construction of such elongate hollow thin-walled storage tanks A is preferably of polyolefin resinous structural materials. Although tank A might be of a unitary one-piece construction, said tank herein is desirably of the dual-segment type comprising a pair of shell-like separately molded resinous segments including upper elongate segment 55 and a lower elongate segment 56, segments 55 and 56 each extending along tank axis P between tank ends 51 and 52. Tank segments 55 and 56 each terminate as a horizontal annular outward protuberance 57 and 58, respectively, the tank segments 55 and 56 being abuttably attached to each other at said protuberances 57–58 at the horizontal plane of tank axis P; the intersegments attachment is attained by an intervening layer of adhesive, resinous heat-sealing techniques, or other prior art joinder methods. The tank upper portion is provided with a filling means opening 53 for charging liquids thereinto. Tank A has a lower elongate extremity 54.

Although the towable liquids storage tank assembly of the present invention is adaptable for the transporting of water and similarly chemically inert liquids, it is particularly adaptable for agricultural use when chemically active liquid pesticides or fertilizers are to be contained within the elongate hollow storage tank. Accordingly, the structural material for the tank is desirably of a chemically inert resinous material, polyolefins such as polyethylenes and polypropylenes tending to be exceedingly resistant to attack by nearly all agricultural liquid pesticides and fertilizers, polyolefins also being a very economical tank structural material. However, it is generally well known that the potential chemical resistance of polyolefin is not in fact achieved if the polyolefin structural material has internal structural discontinuities or unrelieved internal stresses. For example, it is recognized in the prior art fabrication techniques of polyolefins, that it is practically impossible to mold container walls that are sufficiently free of internal structural discontinuities, unless the tank wall thickness is less than about three-eighth inch.

Such ⅜-inch or less polyolefin container wall thickness N, while being acceptable for carrying relatively small liquid volumes, are not economically appropriate to the common agricultural situation wherein 200 or more gallons of liquid pesticide or fertilizer 59, and weighing upwards of 1,400 pounds, are to be carried about in a single elongate tank positioned across the parallel rails, e.g. R, of the customary tank trailer, e.g. C. Moreover, when a 200-gallon elongate tank (having internal dimensions of thirty inch diameter along D and 74-inch length along P) carrying 1,400 pounds of liquid therein is laid across several of the trailer rails R, the liquid-laden necessarily thin-walled polyolefin tank will sag and flex at the 15-inch or more abrupt gaps between the trailer rails, e.g. R, such unrelieved stresses causing a pronounced deterioration in the tank's resistance to chemical attack. It can be clearly appreciated herein that for the typical elongate thin-walled polyolefin tank, e.g. A, the interior tank height, e.g. D, bears a ratio within the range of at least 50 to 80 with respect to the ⅜-inch or less wall thickness N, while the tank axial length exceeds N by a factor within the range of 100 to 200.

About one-half the external surface area for any elongate hollow liquids storage tank, e.g. A, is disposed below the tank elongate axis, e.g. P, and herein the "lower-half external surface area" for tank A is disposed below and coextensively along the intersegments juncture line 57–58. An elongate tublike saddle B is substantially coextensive along the major proportion of the tank's "lower-half external surface area," herein said major proportion being positioned below the saddle's substantially horizontal annular upper end 41 which is located immediately below the 57–58 intersegments juncture line. The internal side of saddle B conforms exceedingly closely, but not adherently, to the elongate tank's lower surface area. When the saddle internal side is in nonadherent exceedingly close conformity to the tank's lower surface area, the saddle B will prevent the liquid-laden tank from developing inimicable internal stresses from the underlying spaced-apart trailer rails R as the trailer C traverses across the terrain. There are means for removably attaching the elongate tank A and tublike saddle B to the towable trailerlike support means C, as by means of two or more flexible steel girth straps S disposed within rail slots 35, said straps S surrounding tank axis P and the tank upper portion 55 and saddle B.

To attain the necessary nonadherence between the elongate polyolefin tank A and saddle B, nonpolyolefin structural materials for saddle B are required. Further, to attain the necessary exceedingly close conformity between the saddle interior surface and the tank lower external surface, molded resinous saddles and preferably of thermosetting dimensionally stable polyesters are preferred. Fibrous-reinforced e.g. with fiber glass resins are contemplated; the saddle has a substantially uniform wall thickness E bearing a ratio to N within the range of about one-quarter to one. It is known that mass-produced heat-molded polyolefin tanks, even when fabricated from the same molding equipment, tend to appreciably vary dimensionally from tank-to-tank; thus, although operable saddles B can result from mass-production heat-molding techniques, it has been found that optimum tank-saddle conformity (and less stress within the liquid-laden tank) results when each saddle is "tailer-molded" to the lower external surface of each tank.

Figure 5:
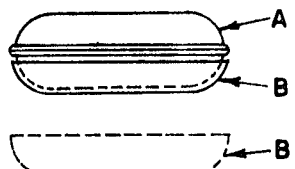
FIG. 5 is a side elevational view similar to FIG. 1 showing schematically the nonadherent relationship between the storage tank and underlying tublike saddle therefor.

A "tailor-molded" saddle, e.g. B, can be made for a given polyolefin elongate tank, with the tank external lower elongate surface being a moldlike pattern therefor. First, the tank A is firmly supported upon the floor or upon a low work table, with the external surfaces to be duplicated, herein along the tank lower segment 56, being exposed in top plan projection to the workman. Next, the external surfaces of the formlike pattern which are not to be duplicated, herein upper segment 55 and the said protuberance 58 are covered with masking tape or similar removably adherent masking means. Then, a very thin initial layer (less than about 40 mils thick) of a liquid thermosettable polyester resin is sprayed onto the outer surfaces of polyethylene lower segment 56 but not onto protuberance 58. The said thin initial layer might comprise 30 parts by weight of ¾-inch length fiber glass to 70 parts by weight of the polyester resin. Next, before the initial layer has fully cured, and while remaining tacky to the touch, a glass or fabric self-sustaining cloth is adherently hand-layed thereupon. Then, an additional quantity of the aforesaid mixture of fiberglass and polyester resin is sprayed onto the adhered cloth until the proper thickness E is attained. When the saddle B having regular thickness E (on the order of about one-eighth inch) has fully cured, the "tailor-molded" tublike saddle B is temporarily removed from the polyolefin tank mold as indicated in phantom line in FIG. 5, and the masking means is removed from the remainder of the tank mold A.

The tailor-molding method described in the preceding paragraph is not limited to tanklike form patterns, nor even to form patterns made of polyolefin structural material. Moreover, the impression-taking resin need not be limited to polyesters. However, it is necessary that the form pattern be of a solid resinous structural material, and that the impression-taking resinous structural material in the liquid form be coatable upon, i.e. wettable to, the pattern external surface, and in the solidified form the impression-taking resin must be nonadherent to and physically releaseable from the underlying form. For such relationships to exist, and for the resinous structural material of the form pattern to be adherent to and remaining solid and nonflammable in the presence of the liquid layer of the solidifiable resinous impression-taking material, the form pattern should comprise polyolefin structural material such as polyethylene or polypropylene. In this vane, "hot-melts" type impression-taking thermoplastic resins are to be avoided, and instead, thermosetting resins which solidify at temperatures below the softening point of the resinous form pattern are desireable. Preferred among such thermosetting resins for use with polyolefin form patterns are the various polyester resins. When such polyesters are utilized as successive layers upon the first layer and allowed to solidify, until about a ⅛-inch or more aggregate thickness has been attained, the resultant polyester shell is self-sustaining and can be readily physically removed from the polyolefin form pattern as indicated in phantom line in FIG. 5. The use of the aforedescribed fiber reinforcements, or even as a self-sustaining cloth, within the impression-taking resin will structurally strengthen the solidified shell.

From the foregoing, the construction and operation of the towable liquids storage tank assembly and the novel molding method herein will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

I claim:

1. A towable liquids storage tank assembly adapted to be hitched in trailerlike fashion to a drayage means so as to be rollably towable along the earth's surface, said towable liquids storage tank assembly comprising:

An elongate hollow thin-walled polyolefin resinous storage tank having a finite given length along a substantially horizontal tank axis, said given length defining two ends for the tank, said tank having an elongate lower extremity, the elongate wall portions of the tank annularly surrounding the preponderant length of said tank axis, said hollow tank along the said tank axis preponderant length being of substantially regular vertical cross-sectional shape including a regular wall thickness for the annular wall portions, the interior vertical height of the tank exceeding the polyolefin regular wall thickness by a factor of at least 50 and the tank axis preponderant length exceeding the said polyolefin wall thickness by a factor of at least 100;

B. an elongate tublike saddle nonadherently extending along the lower external side of the polyolefin tank including along the tank elongate lower extremity, the saddle having a substantially horizontal upper end positioned nearer to the tank axis than to the tank lower elongate extremity, said saddle having a shell-like thin wall of substantially regular thickness, the saddle structural material being nonadherent to the polyolefin resinous structural material of the tank; and C. a rollably towable trailerlike support means disposed along a substantially horizontal longitudinal axis, the upper side of said rollable support means including a plurality of spaced-apart substantially parallel coelevational rails, the distance between at least one consecutive pair of parallel rails bearing a ratio of at least one-fifth with respect to the tank finite given length, the said tublike saddle resting across the plurality of substantially parallel rails, and means for removably attaching the elongate tank and the underlying supporting saddle to the towable trailerlike supporting means.

2. The towable liquids storage tank assembly of claim 1 wherein the the thin-walled storage tank is substantially wholly provided of a polyolefin resinous structural material; wherein the regular wall thickness of the wall portions of the elongate tank is less than about three-eighth inch; wherein said elongate tank comprises an elongate upper segment and an elongate lower segment, both said segments having said finite given length and intersecting as an outward tank protuberance positioned substantially at the horizontal plane of the tank-axis; and wherein the major gravimetric proportion of the thin-walled elongate tublike saddle comprises a non-polyolefin resinous structural material.

3. The towable liquids storage tank assembly of claim 2 wherein the thin-walled storage tank is substantially wholly provided of polyethylene; wherein the saddle horizontal upper end is of substantially coelevation with the tank axis immediately below the tank outward protuberance; wherein the structural material of the saddle comprises a structurally continuous polyester matrix internally reinforced with particulate fibrous material; and wherein the regular wall thickness of said polyester saddle bears a ratio to the tank elongate wall-thickness of within the range of one-quarter to one.

4. The assembly of claim 3 wherein the tublike saddle is internally provided with a self-sustaining clothlike reinforcing layer located nearer to the tank and to the saddle interior surface than to the saddle exterior surface; and wherein girth straps are employed for removably attaching the tank and saddle to the trailerlike supporting means.